July 11, 1933.  F. A. SMITH  1,917,609
LOCK STRUCTURE
Filed March 14, 1932
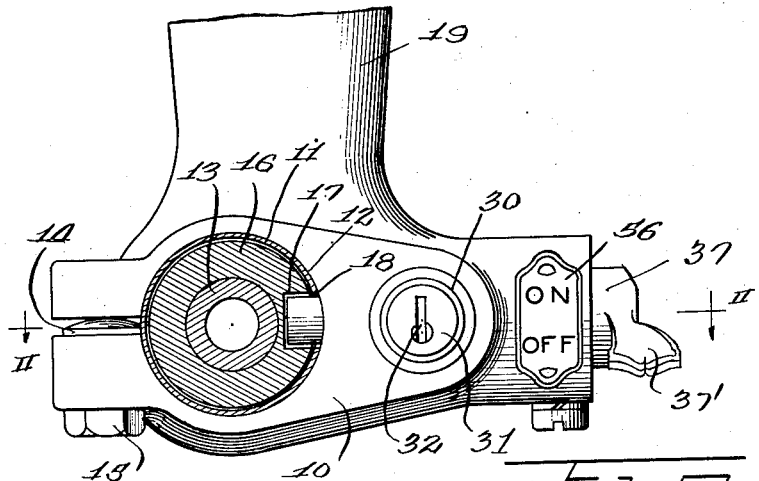
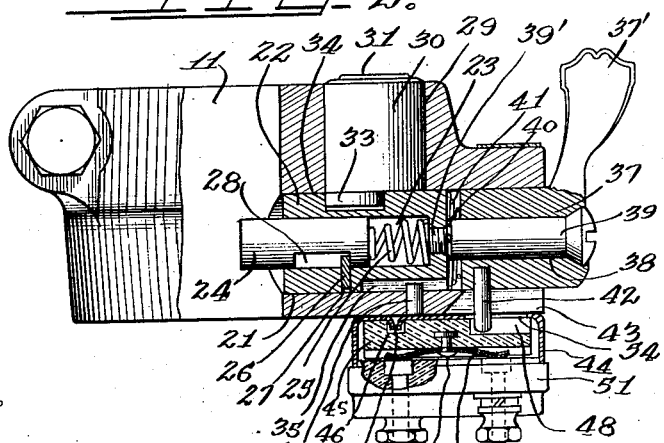
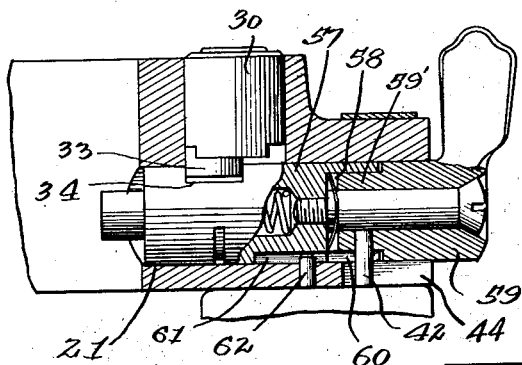
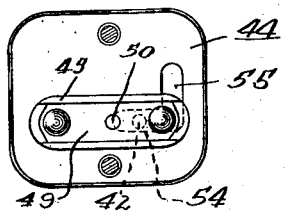
Inventor
Frederick A. Smith.
by Charles Hill
Attys.

Patented July 11, 1933

1,917,609

UNITED STATES PATENT OFFICE

FREDERICK A. SMITH, OF NORTH CHICAGO, ILLINOIS, ASSIGNOR TO OAKES PRODUCTS CORPORATION, OF NORTH CHICAGO, ILLINOIS, A CORPORATION OF MICHIGAN

LOCK STRUCTURE

Application filed March 14, 1932. Serial No. 598,555.

My invention relates to improved lock structure for sequential locking or releasing of certain control elements as for example, the steering control and the ignition control in automotive vehicles.

The invention concerns particularly that type of lock mechanism in which a locking bolt element is provided for locking and unlocking the steering control, and an actuating element adapted by its rotation to cause operation of the switch for controlling the ignition circuit, together with means for preventing operation of the switch by the actuating element when the lock bolt element is in steering locking position and to prevent movement of the lock bolt element to locking position when the actuating element is in a certain switch controlling position.

An important object of the invention is to provide structure and arrangement in which the locking bolt element is capable of axial movement to locking or unlocking position but is at all times held against rotational movement, and the switch actuating element is shiftable with the lock bolt element but is rotatable relative thereto for switch operation only when the lock bolt element is shifted to unlocking position.

A further object is to provide arrangement in which the switch actuating element, when shifted inwardly with the non-rotatable locking bolt element, may be freely rotated to open and close the switch, together with means for preventing outward movement of the lock bolt structure to locking position except when the switch actuating member is in position to open the switch.

Still a further object is to provide simplified structure and cooperation of the various elements of the lock and for easy and convenient and labor-saving assembly of the various parts.

The various features of my invention are shown incorporated in the structure disclosed on the drawing, in which drawing Figure 1 is a plan view of the lock structure applied to the steering column which is shown in transverse section;

Figure 2 is a section on plane II—II of Figure 1;

Figure 3 is a plan view of the movable switch element and its housing; and

Figure 4 is a section similar to Figure 2 showing a modified arrangement.

The lock structure shown comprises the body or housing 10 having at one side the vertical cylindrical passageway 11 therethrough for receiving the steering column 12 of an automotive vehicle, through which column extends the steering shaft 13 supporting at its upper end a wheel (not shown) by which the shaft may be turned for steering the vehicle. The body is open by a slit or slot 14 so that it may be securely contracted into intimate and secure engagement with the steering column as by means of a bolt 15. A collar 16 is rigidly secured to the steering shaft and has a locking notch 17 at one side thereof which registers with the opening 18 through the steering column when the steering shaft is in a certain position, usually in the position for straight forward travel of the vehicle. An arm or bracket 19 which may be integral with the housing 10 extends rearwardly therefrom behind the steering column, this arm being shown broken away but in practice it terminates in flanges (not shown) by means of which the arm may be secured to a suitable support, as for example the dash board of the vehicle.

Extending through the housing 10 preferably at right angles to the axis of the steering column is a cylindrical bore 21 for receiving the lock bolt element and the switch actuating element. The lock bolt element comprises the cylindrical body 22 which fits in the bore 21 to be guided therein and has an axially extending pocket 23 for the lock bolt 24, a spring 25 tending to shift the bolt outwardly. To limit the movement of the bolt, a stop plate 26 is secured in a slot 27 in the body 22 and projects into the longitudinally extending notch 28 in the bolt.

Extending upwardly through the body 10 from the bore 21 is the cylindrical chamber 29 for supporting a lock cylinder 30 in which is a lock barrel 31 which may be turned by means of a suitable key inserted in the keyhole 32, the lock at its inner end carrying a cylindrical cam disc 33 whose center is at one side of the axis of the lock barrel and which engages in the notch 34 cut in the side of the bolt structure body 22 so that when the key is turned in the lock the bolt structure will be shifted in axial direction in the bore 21 to locking or unlocking position. When the bolt structure is shifted outwardly, the bolt 24 will enter the hole 18 in the steering column and if the notch 17 in the ring 16 is in alignment with the hole 18 the bolt will be forced by its spring into the notch thus to lock the steering shaft 13 to the column and prevent steering movement of the steering wheel. The lock barrel has a rotational movement of 180 degrees and when the cam disc 33 is at the outer side of the lock cylinder axis, the bolt structure will be locked in its outer or locking position as shown in Figure 2, and when the lock barrel is turned 180 degrees, the lock bolt structure will be shifted inwardly to unlocking position and will be held in this position by the cam disc.

Along its inner section and at its lower side the bolt structure body 22 has the longitudinally extending slot 35 into which extends the stop pin 36 secured in the adjacent wall of the body 10, the engagement of the pin in the slot holding the lock bolt body 22 against rotational movement in the bore 21.

The switch actuating element comprises a cylindrical hub 37 from which extends the arm or lever 37'. The hub is of a diameter to have bearing fit in the outer end of the bore 21 and the hub has the axially extending passageway 38 for a screw 39 which has the reduced threaded end 39' for threaded engagement in the inner end of the bolt structure body 22, a spring washer 40 being preferably interposed between the screw and the bolt structure body so that the screw may be rigidly secured to the body 22 to serve as a fulcrum for the switch actuating element. The outer end of the screw passageway 38 in the hub 37 is countersunk to receive the conical head of the screw and a suitable spring 41 is inserted between the opposed ends of the hub and the screw structure body, this spring tending to hold the actuating element in outer position against the screw head and to prevent rattling of the actuating element. With the arrangement described, the switch actuating element shifts axially with the bolt structure body 22 as the bolt structure is shifted to locking or unlocking position, but the actuating element may be rotated on the screw 39.

Secured to and extending from the hub 37 is a pin 42 for cooperation with the switch, the adjacent wall of the body 10 having the clearance space 43 provided therein for the pin. The switch structure is mounted on the rear side of the housing 10 and comprises the cup-shaped casing 44 which may be of sheet metal and of rectangular contour. Within the casing is the oblong switch block 45 having on its inner side and at one end thereof a pivot hole 46 for receiving a pivot post 47 which may be formed by deflecting inwardly a section of the bottom of the casing 44, the switch block being thus pivoted for swinging movement in the casing. In its inner side and at the opposite end of the switch block is the longitudinally extending slot 48 into which the actuating pin 42 extends so that when the hub 37 is rotated, the switch block will be swung.

On its outer end the switch block supports a switch blade 49 which is secured at its middle point to the block as by means of a rivet 50. The insulating cover 51 for the casing mounts the terminal posts 52 and 53 whose inner ends are flush with the inner face of the block. One end of the switch blade 49 is in alignment with the switch block pivot axis and is always in electrical engagement with the terminal posts 52. The other terminal post 53 is offset laterally so that when the switch block is parallel with the axis of the hub 37, the other end of the switch blade will be disconnected from the terminal post so that the circuit connected with the post is open.

In the bottom wall of the casing 44 is an L-shaped slot having the longitudinally extending section 54 and the transversely extending section 55. When the lock bolt structure is in its locking position as shown in Figure 2, the pin 42 is in the longitudinal slot section 54 and the hub 37 cannot, therefore, be rotated to close the switch. However, when the lock bolt structure is shifted axially to unlocking position the pin 42 comes into alignment with the transverse slot 55 and then the hub 37 may be rotated as the pin 42 travels through the tranverse slot. The switch actuating element may now be freely rotated to either open or close the switch. When the pin 42 travels from the slot 54 through the slot 55 the switch block is swung so that both terminal posts 52 and 53 will be engaged by the switch blade 49 and the circuit will be closed. From this position of the switch closure the lock bolt structure cannot be shifted back to locking position on account of the engagement of the pin 42 in the transverse slot 55, and the switch actuating element must be rotated to bring the pin 42 back into alignment with the longitudinal slot 54 before the lock bolt structure can be shifted back to locking position. The vehicle steering can thus be locked only after movement of the switch to circuit opening position and the switch can be closed by its actuating element only when the lock bolt structure has been shifted to unlocking position.

On the housing 10 an escutcheon plate 56 is provided having the indications "on" and "off" thereon and the arm 37' of the switch actuating element will act as a pointer to indicate the condition of the circuit. The axial position of the switch actuating element will indicate whether the steering block is on or off.

In Figure 4 is shown a slightly modified arrangement. The body 57 of the lock bolt structure has the cylindrical recess 58 in its inner end for receiving the reduced inner end 59' of the switch actuating element hub 59. In the wall surrounding the recess 58 is the slot or clearance passage 60 for the pin 42 extending from the hub 59 for cooperation with the switch structure, the slot 60 being wide enough to permit the switch actuating swing of the pin, movement of the pin and consequent movement of the actuating element being controlled by an L-shaped slot in the switch casing 44 as in the arrangement of Figure 2. Inwardly of this wide slot 60 the bolt structure body 57 has the narrower longitudinally extending slot 61 for receiving the stop pin 62 so that the bolt structure is prevented at all times from rotating. The operation of the structure of Figure 4 is the same as that of the structure disclosed in Figures 1, 2 and 3. In both structures, the parts are of simple design and can be very economically manufactured and assembled and a compact, efficient lock structure is produced.

I have shown efficient and practical embodiments of the various features of my invention, but I do not desire to be limited to the exact structure, arrangement and operation shown and described, as changes and modifications may be made without departing from the scope of the invention as defined by the appended claims.

I claim as follows:

1. In combination, an axially movable locking bolt element and means for effecting such movement, means preventing rotational movement of said bolt element, a switch, an actuating element for said switch coupled to said locking bolt element to shift axially therewith but being rotatable independently thereof, and means whereby said actuating element is operable only when said bolt element is in unlocking position.

2. In lock structure, an axially movable locking bolt element and means for effecting such movement, means preventing rotational movement of said bolt element, a switch, an actuating element for said switch movable with said bolt element and adapted for rotational movement relative thereto, and means locking said actuating element against switch actuating movement except when said bolt element is in its unlocking position.

3. In combination, an axially movable locking bolt element and means for effecting such movement, means preventing rotational movement of said bolt element, a switch, an actuating element for said switch connected with said bolt element to follow the axial movement thereof but being adapted for rotational movement independently of said bolt element, means locking said actuating element against rotation except when said bolt structure is in unlocking position, and means for preventing movement of said bolt structure to locking position when said actuating element is in one position of switch control.

4. In combination, a lock bolt element, a switch, an actuating element for said switch, means for axially shifting said elements for movement of the bolt element to locking or unlocking position, means preventing rotational movement of the bolt element, and means adapting said actuating element for rotational movement to operate said switch only after shift of said elements to move the lock bolt element to unlocking position.

5. In combination, a lock bolt element, a switch, a switch actuating element, said elements being shiftable axially together to move said bolt element to locking or unlocking position, and means whereby said actuating element may be rotated independently of movement of said bolt element to operate said switch.

6. In lock structure, the combination of a lock bolt element adapted for axial reciprocation to locking or unlocking position, a stud extending from said bolt element, an actuating element mounted on said stud for rotation thereon and to be shifted axially with said bolt element, and control means operated by the rotation of said actuating element.

7. In combination, a housing having a guide bore, a lock bolt element and an actuating element mounted in said bore and connected to be shifted together for movement of said bolt element to locking or unlocking position, said actuating element being rotatable independently of rotational movement of said bolt element, and a switch controlled by said actuating element.

8. In combination, a housing structure having a guide bore, a locking bolt element and an actuating element in said bore, a stud extending from said bolt structure for receiving said actuating element whereby said elements may be shifted together in said bore for movement of the bolt element to locking or unlocking position, means locking said actuating element against rotation when the bolt element is in locking position and for releasing said actuating element for rotational movement when the bolt element is in unlocking position, and a switch controlled by the rotational movement of said actuating element.

9. In combination, housing structure having a guide bore, a lock bolt element movable axially in said bore to locking or unlocking position, a stud extending from said bolt element, an actuating element mounted on said stud for rotational movement and connected thereby to move axially with said lock bolt element, a switch in said housing structure, and interlocking connection between said actuating element and said housing structure operable to prevent rotational movement of said actuating element unless said bolt element is in unlocking position and to prevent movement of the bolt element to locking position when said actuating element is moved from its released position, said switch being controlled by the rotational movement of said actuating element.

10. In combination, a bolt element adapted only for movement in axial direction, a rotatably mounted actuating element connected to move with said bolt element, a switch controlled by the rotational movement of said actuating element, and means controlled by the axial movement of said actuating element to lock it against rotational movement except when said bolt element is in unlocking position.

11. In combination, a bolt element adapted only for movement in axial direction, a rotatably mounted actuating element connected to move with said bolt element, a switch controlled by the rotational movement of said actuating element, means controlled by the axial movement of said actuating element to lock it against rotational movement except when said bolt element is in unlocking position, and means controlled upon switch closing rotation of said actuating element to lock said element against axial movement and return of said bolt element to locking position.

12. In combination, an axially shiftable lock bolt element, an actuating element rotatable independently of said bolt element but shiftable therewith, and a switch operable by said actuating element.

13. In combination, a lock bolt element shiftable to locking or unlocking position, an actuating element shiftable with said lock bolt element to an inoperative or operative position and rotatable independently of said bolt element when in operative position, and a switch controlled by the rotation of said actuating element.

14. In combination, a lock bolt element and means for shifting said element to locking or unlocking position, a switch, an actuating element adapted for bodily movement with said bolt element and for another movement independently of said bolt element, said switch being operable by said actuating element during such independent movement thereof.

15. In combination, a lock bolt element and means for shifting said element to locking or unlocking position, a switch, an actuating element adapted for bodily movement with said bolt element and for another movement independently of said bolt element, said switch being operable by said actuating element during such independent movement thereof, and means for locking said actuating element against switch operating movement when said lock bolt element is in locking position.

16. In combination, an axially shiftable lock bolt member, an actuating member, means adapting said actuating member for bodily movement with said bolt member and for rotary movement independently of said bolt member, and a switch operable by the rotary movement of said actuating member.

17. In combination, a shiftable lock bolt element, an actuating element coaxial with said lock bolt element, means adapting said actuating element for bodily movement with said lock bolt element to operative or inoperative position, means adapting said actuating element for rotational movement independently of said lock bolt element when in operative position, and a switch controlled by said actuating element.

In testimony whereof I have hereunto subscribed my name at North Chicago, Lake County, Illinois.

FREDERICK A. SMITH.